United States Patent
Holz et al.

(10) Patent No.: US 6,765,194 B2
(45) Date of Patent: Jul. 20, 2004

(54) ARRANGEMENT INCLUDING A PLURALITY OF OPTICAL FIBER BRAGG GRATING SENSORS AND METHOD FOR DETERMINING MEASURED VALUES IN SUCH ARRANGEMENT

(75) Inventors: Michael Holz, Senden (DE); Michael Trutzel, Blaustein (DE)

(73) Assignee: DaimlerChrysler AG, Stuttgart (DE)

( * ) Notice: Subject to any disclaimer, the term of this patent is extended or adjusted under 35 U.S.C. 154(b) by 176 days.

(21) Appl. No.: 09/814,628

(22) Filed: Mar. 22, 2001

(65) Prior Publication Data

US 2001/0048071 A1 Dec. 6, 2001

(30) Foreign Application Priority Data

Mar. 23, 2000 (DE) .......................................... 100 14 175

(51) Int. Cl.[7] ................................................. G02B 6/34
(52) U.S. Cl. .................................... 250/227.12; 385/37
(58) Field of Search ........................ 250/227.12, 227.18, 250/227.19; 385/37, 35.5; 356/32

(56) References Cited

U.S. PATENT DOCUMENTS

| | | | |
|---|---|---|---|
| 4,996,419 A | 2/1991 | Morey | 250/227.18 |
| 5,401,956 A | 3/1995 | Dunphy et al. | 250/227.18 |
| 5,680,489 A | * 10/1997 | Kersey | 385/12 |
| 5,825,464 A | * 10/1998 | Feichtner | 356/4.02 |
| 5,987,197 A | * 11/1999 | Kersey | 385/24 |
| 6,233,373 B1 | * 5/2001 | Askins et al. | 385/12 |

OTHER PUBLICATIONS

Hjelme et al. "Multiplexed fiber optic Bragg–grating strain sensor system for use in marine vehicle testing" in SPIE, vol. 2838, pp. 40–51, (Aug. 1996.).

* cited by examiner

Primary Examiner—Scott J. Sugarman
Assistant Examiner—Richard Hanig
(74) Attorney, Agent, or Firm—Davidson, Davidson & Kappel, LLC

(57) ABSTRACT

An arrangement for determining measured values, in particular measured pressure values, strain values, or temperature value, using a plurality of optical fiber Bragg grating sensors. The optical fiber Bragg grating sensors are combined to form various arrays of optical fiber Bragg grating sensors that are arranged one behind the other, are connected by fiber optics, and exhibit different frequency selectivities. Delay elements are assigned to these arrays. The Bragg grating sensors receive a uniform query signal representing a time-differentiated, frequency-selective light. The frequency-selective Bragg grating sensors of the various arrays generate partial signals. The partial signals, separated temporally from one another by the delay elements, form a sequence of partial signals. From the knowledge of the propagation delays of the signals and from the knowledge of the frequency information of the query signal, the particular intended measured value is able to be related to a specific Bragg grating sensor of a specific array, thereby enabling the measured value to be allocated to the location of this Bragg grating sensor.

14 Claims, 3 Drawing Sheets

ARRANGEMENT INCLUDING A PLURALITY OF OPTICAL FIBER BRAGG GRATING SENSORS AND METHOD FOR DETERMINING MEASURED VALUES IN SUCH ARRANGEMENT

FIELD OF THE INVENTION

The present invention is directed to a method for determining measured values in an arrangement including a plurality of optical fiber Bragg grating sensors, as well as to an arrangement for implementing this method.

RELATED TECHNOLOGY

Optical fiber Bragg grating sensors (FBGs) are a new type of very rugged class of sensors used for measuring strains, preferably highly resolved to measuring lengths of 0.1 to 20 mm, or also temperature differences.

In aerospace and aeronautics, as well as in the automotive and railroad sectors, these sensors open up many potential applications in the area of vehicle inspection, particularly for all types of adaptive control systems, and, in the metrology sector, for example for experimental stress analysis. Optical fiber Bragg grating sensors of this kind are known, for example, from U.S. Pat. No. 4,996,419. Compared to conventional approaches employing strain gauges or piezosensory technology, Bragg grating sensors offer a number of benefits due to their compact type of construction. Their small fiber diameter, in particular, makes them especially suited for integration in fiber-reinforced composite structures, as frequently used in aeronautic construction. Since the measuring signal of the optical fiber Bragg grating sensors is frequency-specific and not amplitude-specific, the measuring signal proves to be independent of the transmitted distance and, thus, also independent of power fluctuations caused by the transmission line. Moreover, as all optical fiber sensors, this sensor proves to be insensitive to electromagnetic interference.

From U.S. Pat. No. 5,401,956, describes a measuring system which is based on Bragg grating sensors and can be used to detect pressure or temperature influences.

SUMMARY OF THE INVENTION

From German Patent Application No. DE 198 56 549 of the applicant, which is not believed to be prior art to the present application, it is known to combine a plurality of optical fiber Bragg grating sensors exhibiting different frequency selectivities into an array; to irradiate them, together with a wavelength-tunable laser, with a light signal that is variable in wavelength; to analyze the response signal that is sensor-selective due to the frequency-selective formation of the various Bragg grating sensors of the array; and to thereby provide information about the measured value in terms of the specific, selected Bragg grating sensor. Thus, measured values, i.e., strain, temperature or measured pressure values, can be determined in one arrangement at the location of a specific sensor of an array.

The potential number of sensors that can be used in an array of this kind is limited by the spectral width of the laser and by the maximal strain of the Bragg grating sensors. For example, using the best tunable lasers, free of mode hopping, that are currently known, it is possible to tune only one spectral range of about 100 nm. This means that, under favorable conditions, a maximum of 100 sensors can be accommodated and, under unfavorable conditions, not even 10 sensors can be accommodated in the array, without losing the ability to distinguish among the sensor signals.

An object of the present invention is to provide an arrangement and a method for determining measured values in such an arrangement using a plurality of optical fiber Bragg grating sensors, which will make it possible to provide an increased number of sensors and, as a result, a location-specific analysis of measuring results.

The present invention provides a method for determining measured values in an arrangement (3) comprised of a plurality of optical fiber Bragg grating sensors (FBGs) (11), which are combined to form various arrays of optical fiber Bragg grating sensors (11), which are arranged one behind the other, are connected by fiber optics, and exhibit different frequency selectivities, and of delay elements (12), which are assigned to these arrays, the optical fiber Bragg grating sensors (11) receiving a query signal which represents temporally differentiated, frequency-selective light, a response signal being evaluated, in that individual partial signals of the response signal are specifically assigned to one or a few optical fiber Bragg grating sensors (FBGs) (11) on the basis of their specific frequency and on the basis of their propagation delay that is essentially determined by the delay elements (12).

The present invention also provides an arrangement comprised of a plurality of optical fiber Bragg grating sensors (FBGs) (11) for implementing the method according to the present invention for determining measured values, where optical fiber Bragg grating sensors (FBGs) are combined to form various arrays of optical fiber Bragg grating sensors (11) that are arranged one behind the other, connected by fiber optics, and have different frequency selectivities, and where delay elements (12) are assigned to these arrays in such a way that the optical fiber Bragg grating sensors (11) are able to receive a query signal which represents temporally differentiated, frequency-selective light, and a response signal is evaluated in such a way that individual partial signals of the response signal are able to be specifically assigned to one or a few optical fiber Bragg grating sensors (FBGs) (11) on the basis of their specific frequency and on the basis of their propagation delay that is essentially determined by the delay elements (12).

In accordance with the present invention, the arrangement composed of a plurality of optical fiber Bragg grating sensors shows a plurality of arrays, which are constituted of individual, optical fiber Bragg grating sensors that are connected by fiber optics, configured one behind the other, and have different frequency selectivity. The various arrays are linked to delay elements, formed at regular intervals by delay lines. The optical fiber Bragg grating sensors receive light from a light source, constituted, for example, of a tunable laser or LED. As a function of the specific frequency selectivities of the individual Bragg grating sensors, specific sensors are activated by the selected wavelength of the light source and transmit a corresponding response signal. The other sensors function passively in response to this wavelength. To distinguish among the activated Bragg grating sensors of the various arrays, these various arrays are connected to delay elements, with the result that the various individual response signals are fed at different times to the receiving system of the measuring arrangement, for example for strain values, temperature values or pressure values. With knowledge of the specific delay times and, thus, of the expected propagation delays of the response signals of the individual sensors of the array, these signals are then able to be differentiated by the receiving system. This ability to distinguish among the individual sensors and, thus, the measured values at the sensor location from others, allows a very differentiated assertion to be made with respect to the measured value distribution over a predefined space having a multiplicity of connected Bragg grating sensors. This arrangement in accordance with the present invention and the method for determining measured values in accordance with the present invention make it possible to distinguish among a multiplicity of differentiated measured values by the use of a corresponding multiplicity of differentiated Bragg grating sensors and to selectively analyze them accordingly. For example, employing this arrangement and method, it is possible to mount several hundred Bragg grating sensors, which are driven and connected according to the present invention, on an airplane wing and, during a brief flight simulation, to measure the strain values of the wing at the positions of the multiplicity of Bragg grating sensors and to analyze them as spatially resolved values.

From the frequency-selective light source that is controlled as a time-differentiated source, for example in the form of a pulsed, spectrally tunable laser that is controlled temporally as well as spectrally by a central control unit, the Bragg grating sensors receive substantially identical light pulses. These light pulses are essentially distinguished from one another only by the time shifts caused by the delay elements that they pass through, and they are obtained, in particular, in that one or a plurality of couplers split the light pulses into a plurality of pulses, all of the same wavelength. In response to the Bragg grating sensors receiving the query signal made up of substantially identical pulses, partial signals are formed in the Bragg grating sensors and generate the arrangement's response signal that is fed to a receiver. The receiver is preferably connected to an integrator that is triggered by the central control unit, so that the received response signal is only detected in predefined timing windows and is fed to the evaluation unit. In this context, the timing windows are selected by the triggering operation in accordance with the expected propagation delays of the partial signals of the individual arrays. This makes it possible to reliably distinguish among the arrays and, thus, among the individual Bragg grating sensors of the individual arrays.

Besides the feasibility of operating the optical fiber Bragg grating sensors in the reflection mode, it is also possible to operate them in the transmission mode. This proves to be especially advantageous when working with vast structures to be tested, since the cabling can be laid out in a simpler fashion.

It has proven to be especially worthwhile for the delay time selection to be controlled by a preferably central control unit. This makes it possible, in accordance with specific requirements, to adapt the variably selected delay times to the measuring tasks and the measuring conditions. In particular, it is possible to exclude individual arrays from the measurement by selecting a very long or infinitely long delay time, and to use only a few individual arrays. Moreover, individual arrays can be selectively switched on or off by altering the delay times during the measurement. This renders possible a very universal application of the various arrays, which are combined to form a total arrangement made up of a plurality of arrays. This arrangement is preferably controlled by a shared central control unit, so that any intervention in the measuring procedure or in the measuring method can be simply carried out.

It has proven to be especially beneficial to selectively choose the delay times of the delay elements, i.e., by properly selecting the delay elements, one is able to reliably distinguish among the reflected or transmitted response signals of the individual Bragg grating sensors. This can be achieved, in particular, by having the delay times always represent a multiple of one another, by satisfying the following rule, for example:

$$t_i = a * n^i$$

$t_i$ representing the delay time of the i-th array, n a natural number>=2, and a the length of the base time interval.

It is advantageous to provide one array that does not have a delay element, i.e., that has a delay time of 0 seconds. This simplifies the design of the arrangement.

Selecting delay times $t_i$ in this manner provides a reliable differentiation of the response signal with respect to differentiation of the partial response signals of the individual arrays.

BRIEF SUMMARY OF THE DRAWINGS

The present invention is elucidated below with reference to the drawings, in which.

DETAILED DESCRIPTION

Figure 1:
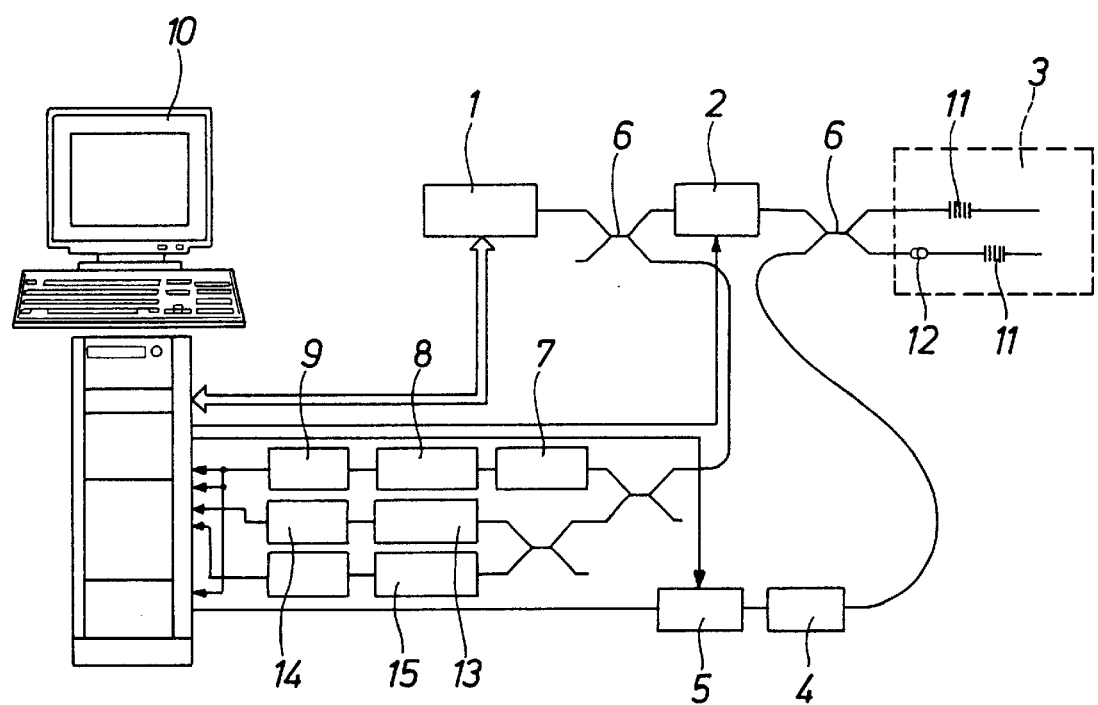
FIG. 1 shows a schematic diagram of measuring arrangement including a plurality of optical fiber Bragg grating sensors according to the present invention.

The measuring arrangement illustrated in FIG. 1 includes a central control unit 10, constituted as a PC having installed multifunctional cards. Central control unit 10 is linked to an external cavity laser 1, which is a wavelength-tunable semiconductor laser that can scan a wavelength range from about 1480 to 1580 nm. The laser's scan characteristic exhibits distinct fluctuations, which, in the measuring system of the present invention, do not lead to a loss of measuring accuracy in the allocation of wavelengths. Laser 1 launches an optical signal into an optical waveguide, which, via a broadband optical fiber coupler 6, feeds half of the optical power to a modulator 2 and the other half to a trigger unit composed of a ring interferometer 7, an amplifier stage 8, and a Schmitt trigger 9. The output of Schmitt trigger 9 leads to the trigger input of control unit 10, which, on the basis of the trigger signal from trigger unit 7, 8, 9, controls laser 1 as well as modulator 2 such that modulator 2 turns on or interrupts the light from laser 1 at predefined instants. The light of a specific wavelength, switched through by modulator 2, is fed via a further coupler 6 to an arrangement 3 of Bragg grating sensors. Representative of one of a number of optical fiber Bragg grating sensor arrays having potentially varying numbers of sensors, arrangement 3 shows only two Bragg grating sensors 11, which represent a multiplicity of Bragg grating sensors 11, and one delay element 12. Through coupler 6 disposed upstream from arrangement 3, both Bragg grating sensors 11 are fed equivalent optical pulses as query signals, which are essentially distinguished only by the propagation shift, or transit-time delay, preset by delay element 12. If, at this point, the wavelength of the query signal matches the sensor wavelength of Bragg grating sensor 11 in question, then one portion of the pulse is reflected as a function of the reflectivity of the Bragg grating sensor. If it does not match the sensor wavelength, then no reflection takes place. If the wavelength of the query signal and the frequency selectivity of the two Bragg grating sensors match, the result is two reflected response signals, which are differentiated by a time displacement set by delay element 12. The reflected response signal, in turn, is fed via coupler 6 to receiver 4 for amplification and, subsequently, to integrator 5. Integrator 5 is controlled via a trigger line by a control signal such that all response signals, supplied in predefined timing windows to the integrator, are summed and fed to an evaluation unit in central control unit 10. In this context, the timing windows are chosen so as to be selective for a specific group of Bragg grating sensors 11, which are combined in a regular configuration to form an array. In this manner, response signals from one group, or array, of sensors can be distinguished from another group, or another array, of sensors, and evaluated and, as the case may be, allocated accordingly.

In the evaluation unit, the analog, integrated signal is converted by a high-speed AD converter, analyzed, displayed, and stored. This evaluation is carried out separately each time the integrator is triggered and, thus, for each timing window, so that all reflected response signals associated with one wavelength are detected by the integrator triggered by central control unit 10, and can be fed to an evaluation in the control unit. As already explained, the triggering is carried out by a ring interferometer 7 and not with the use of a timer, since fixed trigger signals are generated as a function of the wavelength of the optical signal supplied by laser 1 at defined wavelengths set by the design of ring interferometer 7. This ensures that all functional units that follow, in particular modulator 2, integrator 5, as well as the evaluation units of control unit 10, are correctly switched or controlled at the proper instant, thus as a function of the active wavelength of the optical pulse. This rules out any false triggering caused by a deviating time base, for example by an internal timer of control unit 10. Therefore, this manner of controlling the various functional units by central control unit 10 as a function of the active wavelength proves to be very reliable.

To assign the measured values derived from integrator 5 to a correct absolute wavelength, the light from laser 1 is not only supplied to trigger unit 7, 8, 9, but also to an absorption cell 13 having known and specific transmission slumps, or dips, of defined wavelengths. The signal emitted by absorption cell 13 is amplified in an amplifier 14 and fed to control unit 10 for evaluation of the absolute wavelength of the laser, which is tuned in its preset frequency band. Thus, a specific wavelength is able to be allocated to each measuring point.

In addition, the query signal from laser 1 is also fed to an optical fiber Fabry-Perot interferometer 15, which is implemented as a modulation shift detector. In the case of a modulation shift, which is detected by the optical fiber Fabry-Perot interferometer, it is possible to allow for variations of this kind in the response signal when evaluating the response signal.

FIG. 2 depicts the time sequence of a measuring operation, as takes place in the measuring arrangement according to FIG. 1 for a method according to the present invention for determining measured values in an arrangement according to the present invention of a plurality of optical fiber Bragg grating sensors. Here, the illustration includes four different sequences occurring simultaneously in the measuring arrangement at the appropriate times, e.g., $t_0$. In this context, simultaneous instants are arranged one below the other in the representations.

Figure 2A:
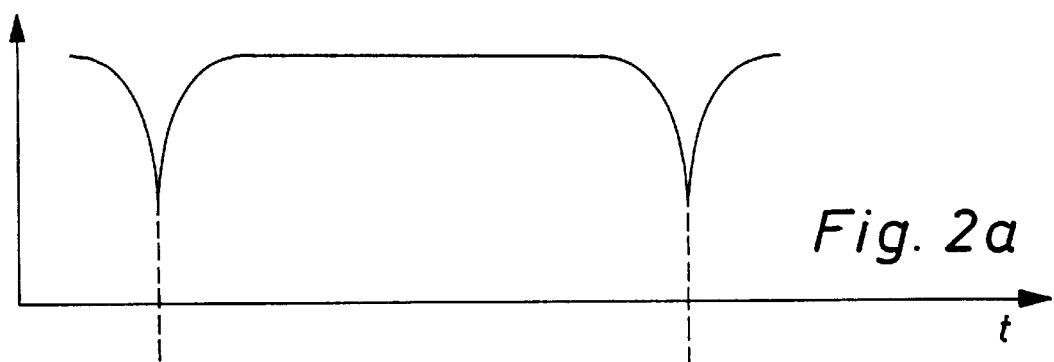
FIGS. 2a–2d show graphical representations of a measuring sequence.
Figure 2B:
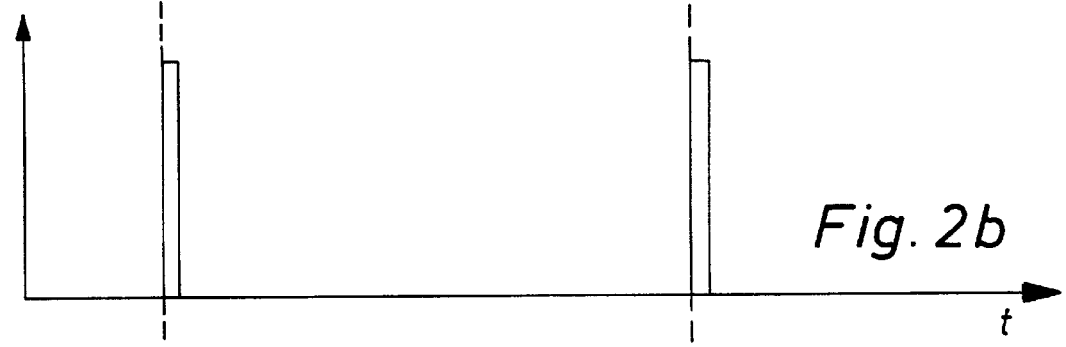

FIG. 2a shows the variation in intensity of the signal downstream from optical-fiber ring interferometer 7. Here, one can perceive distinctly characteristic dips in intensity, which correspond to specific wavelengths of the tuned query signal transmitted by laser 1. These dips in intensity are used to set the triggering of the various other units to be triggered. Among other things, modulator 2 is controlled by a trigger signal as shown in FIG. 2b.

Figure 2C:
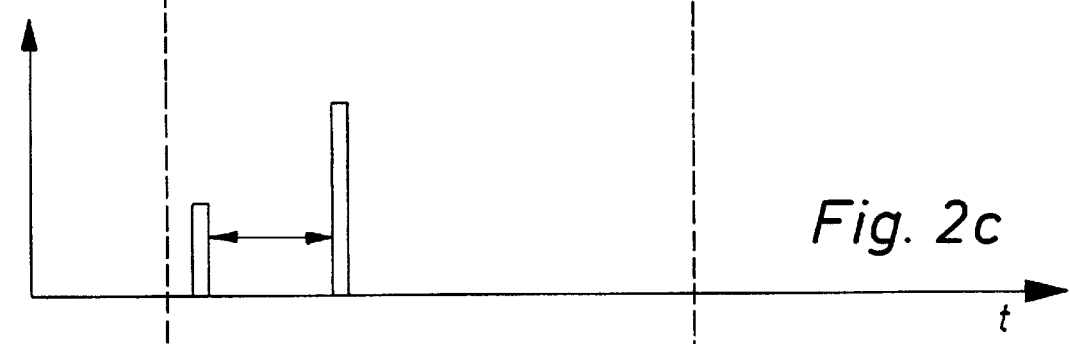
Figure 2D:
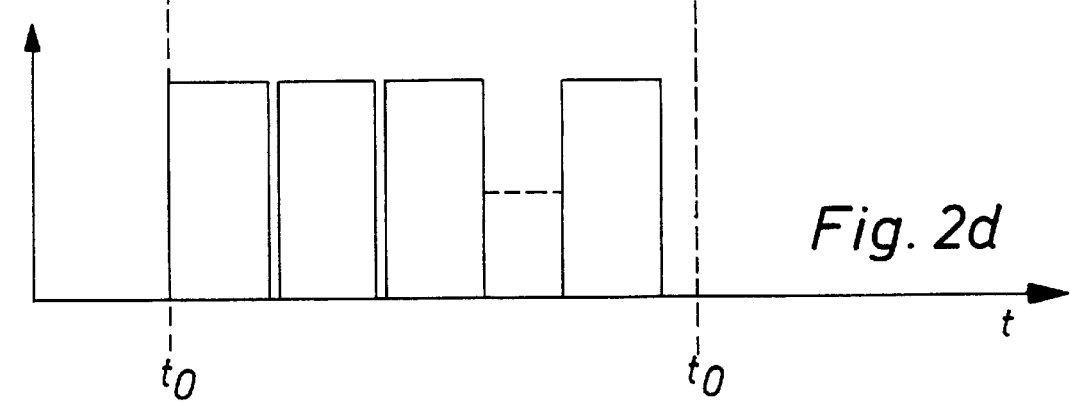

FIG. 2c depicts various partial signals of the response signal in receiver 4. The interval between the two partial signals is essentially established by the time delay set in delay element 12. This time delay makes it possible to differentiate the partial signals of the response signal from one another and to analyze them separately. This is achieved by selectively triggering integrator 5, thereby establishing defined timing windows $z_1$, which correspond to predefined delay times to be expected. Within these timing windows $z_i$, all incoming partial signals are summed and supplied as an analog signal to central control unit 10, which, in response to triggering by trigger unit 7, 8, 9, digitally converts the signal that is integrated in a specific timing window, assigns it to a specific array and, thus, in conjunction with the likewise available frequency information, to a specific Bragg grating sensor of a specific array, and evaluates it.

A previously unfeasible number of Bragg grating sensors and, thus, an especially first-rate quality spatial resolution of the measured values to be detected, which can represent measured temperature, strain, or pressure values, are rendered possible by this Bragg grating sensor-selective evaluation of the signal, with the aid of the frequency information and the timing window information, correlated to the delay element selection.

Three examples of possible arrangements, also referred to as topologies, of arrays of optical fiber Grating sensors (FBGs) are shown in FIG. 3. In this context, an array is made up of a plurality of Bragg grating sensors having different frequency selectivities. This ensures that, essentially, only one single Bragg grating sensor of an array functions in response to a predefined frequency or wavelength of the query signal and emits a corresponding reflection signal or transmission signal.

Figure 3A:
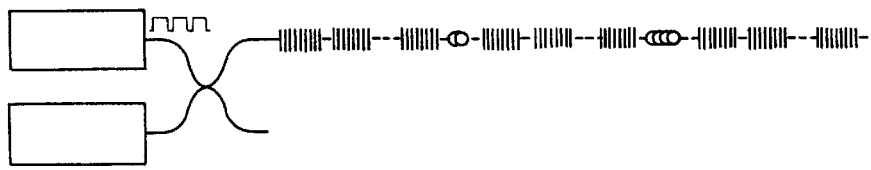
FIGS. 3a–3c show schematic diagrams of exemplary topologies of an arrangement according to the present invention.

FIG. 3a shows a serial arrangement of arrays. These arrays are interconnected by optical waveguides having interposed delay elements 12. When the pulsed laser generates a query signal, it is fed via coupler 6 to the various arrays, arranged one behind the other and, thus, serially, and thereby to the individual grating sensors of the individual arrays. All Bragg grating sensors of the arrangement according to the present invention essentially receive the equivalent query signal. If the frequency of the query signal matches the frequency selectivity of a Bragg grating sensor of an array, then a response to the query signal is generated in this array as a reflected partial signal and is transmitted in the direction of coupler 6. Each time the transmitted optical signal propagates through a delay element 12, it is subject to a time delay, so that the partial signals of the response signal from the downstream array reach coupler 6 at a substantially later point in time, and, are fed, correspondingly later, to the receiving system, made up of receiver 4, integrator 5, and control unit 10. Due to this specific delay resulting from the summing of the individual time delays of the delay elements 12 that arise on the path of the query signal, respectively on the return path of the partial signal of the response signal, it is possible to selectively separate the partial signals in accordance with the individual arrays and, in conjunction with the frequency information, in accordance with the individual Bragg grating sensors of the individual arrays. Therefore, a specific measured value for pressure, temperature or strain is able to be determined at the location of this particular Bragg grating sensor from the measured signal in receiving system 4, 5, 10.

Figure 3B:
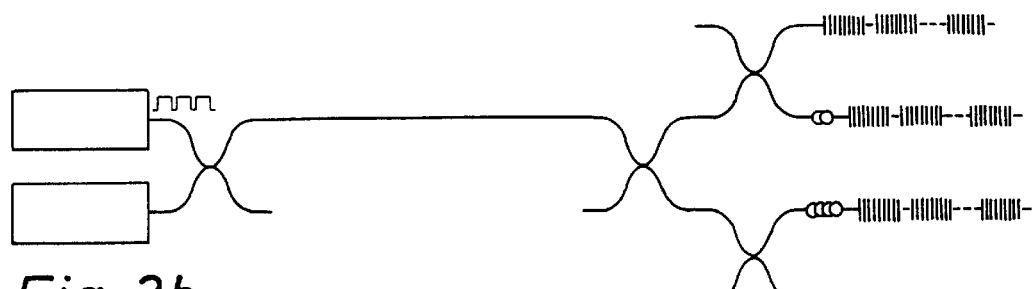

In comparable fashion, an arrangement of parallel-connected arrays is shown in FIG. 3b. Each array is subject to a specific time delay, which is preset by a corresponding delay element. In this context, a delay of variable magnitude is indicated by the number of circles shown. The topmost array of the parallel-arranged arrays is subject to a delay by zero delay time units, the second by two, and the third by four delay time units. The various arrays receive the equivalent query signal through upstream couplers 6. In the illustrated arrangement, this parallel configuration of arrays is operated in the reflection mode, i.e., the query signal supplied via couplers 6 to the arrays is supplied via the same coupler 6 as the response signal to receiving system 4, 5, 10. The evaluation and the method of functioning of this parallel arrangement corresponds to the previously described method of functioning.

Figure 3C:
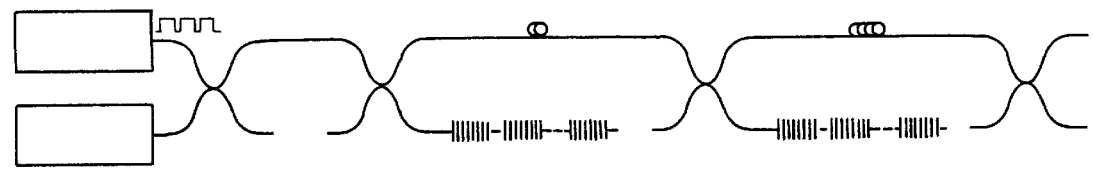

Besides the purely serial and the parallel arrangement, a mixed arrangement of arrays is also possible in the form of tree-like nested structures, where the arrays are configured both in parallel as well as in serial structures. Such a structure is shown in FIG. 3c. An arrangement of this kind can be easily adapted to the object to be measured.

What is claimed is:

1. A method for determining measured values in an arrangement including a plurality of optical fiber Bragg grating sensors, the method comprising:

disposing the plurality of optical fiber Bragg grating sensors so as to form at least one sensor array, each of the respective optical fiber Bragg grating sensors in each of the at least one sensor array being arranged one behind the other, being connected by fiber optics, and exhibiting a different respective frequency selectivity;

providing at least one respective delay element in at least one of the at least one sensor array;

providing a query signal of temporally differentiated, frequency-selective narrow band light of variable center wavelength;

receiving the query signal using the plurality of optical fiber Bragg grating sensors; and evaluating a response signal so as to assign respective individual partial signals of the response signal to one or more of the plurality of optical fiber Bragg grating sensors based on respective frequencies of the individual partial signals and based on respective propagation delays of the individual partial signals, the respective propagation delays being substantially determined by the at least one respective delay element.

2. The method as recited in claim 1 wherein a respective delay time of each of the at least one respective delay element is selectively chosen.

3. The method as recited in claim 2 wherein the respective delay time of each at least one respective delay element is variably selected and satisfies $$t_i = a * n^i,$$

where $t_i$ is the respective delay time, $a > 0_s$ and $n >= 2$ and $i > 0$.

4. The method as recited in claim 2 wherein the choosing of each respective delay time selection is performed using a control unit.

5. The method as recited in claim 1 wherein the arrangement is operated in a transmission mode.

6. The method as recited in claim 1 wherein the arrangement is operated in a reflection mode.

7. The method as recited in claim 1 wherein the at least one array includes a first and a second array disposed serially with respect to each other.

8. The method as recited in claim 1 wherein the at least one array includes a first and a second array disposed in parallel with respect to each other.

9. The method as recited in claim 1 wherein the at least one array includes includes a plurality of arrays disposed serially in part and in parallel in part with respect one another.

10. An arrangement for determining measured values, the arrangement comprising:

a plurality of optical fiber Bragg grating sensors disposed in at least one sensor array, each of the respective optical fiber Bragg grating sensors in each of the at least one sensor array being arranged one behind the other, being connected by fiber optics and exhibiting a different respective frequency selectivity, wherein the plurality of optical fiber Bragg grating sensors are configured to receive a query signal of temporally differentiated, frequency-selective narrow band light of variable center wavelength;

at least one respective delay element associated with at least one of the at least one sensor array;

a light source configured to provide the temporally differentiated, frequency-selective narrow band light of variable center wavelength; and an evaluation unit configured to evaluate a response signal so as to assign respective individual partial signals of the response signal to one or more of the plurality of optical fiber Bragg grating sensors based on respective frequencies of the individual partial signals and based on respective propagation delays of the individual partial signals, the respective propagation delays being substantially determined by the at least one respective delay element.

11. The arrangement) as recited in claim 10 wherein the light source includes a pulsed, spectrally tunable laser, and further comprising a control unit for controlling the light source temporally as well as spectrally.

12. The arrangement as recited in claim 10 wherein the light source includes a pulsed, spectrally tunable laser, and further comprising:

a control unit for controlling the light source temporally as well as spectrally; and a modulator assigned to the control unit, the modulator having a signal output that is triggered by the control unit.

13. The arrangement as recited in claim 12 further comprising:

an integrator; and a ring interferometer for generating a trigger signal using the control unit, the trigger signal for temporally controlling the integrator, the light source, the modulator, and a signal evaluation in the control unit.

14. The arrangement as recited in claim 10 further comprising:

a control unit for controlling the light source temporally as well as spectrally; and an integrator, the integrator being triggered by the control unit so as to sum the response signal within preset timing windows in a time-separated fashion.

* * * * *